UNITED STATES PATENT OFFICE.

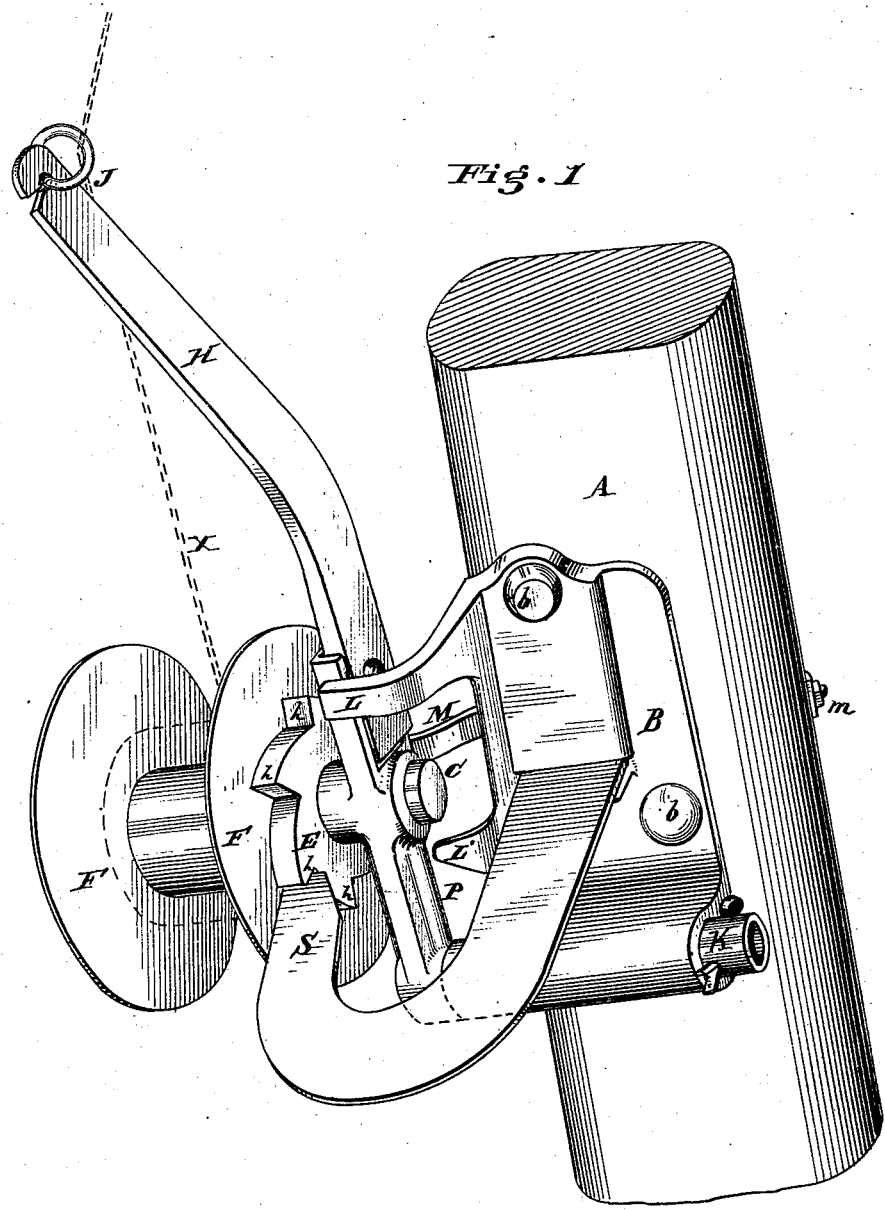

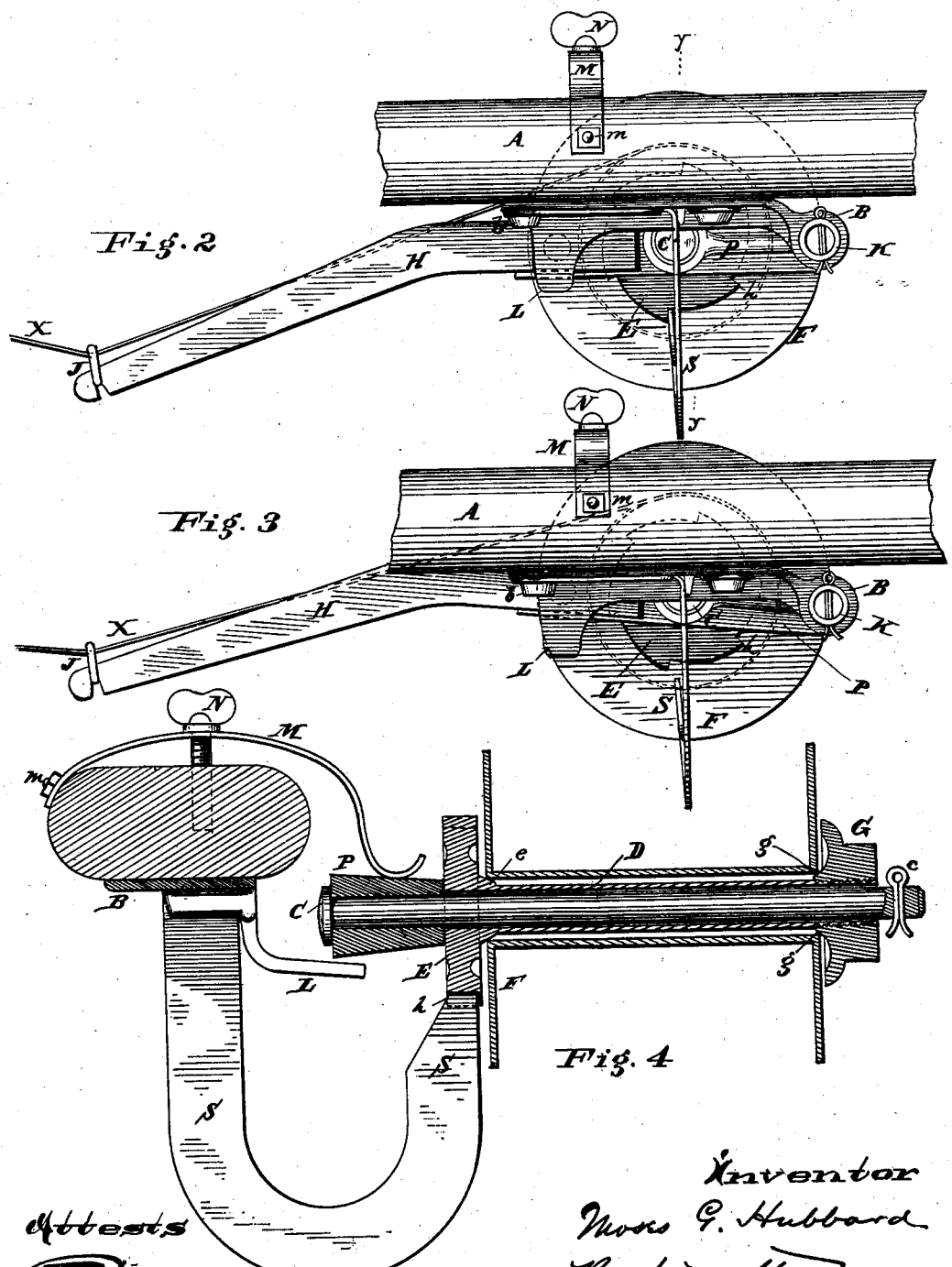

MOSES G. HUBBARD, OF NORRISTOWN, PENNSYLVANIA.

TAKE-UP AND TENSION FOR GRAIN-BINDERS.

SPECIFICATION forming part of Letters Patent No. 248,261, dated October 11, 1881.

Application filed February 4, 1881. (No model.)

*To all whom it may concern:*

Be it known that I, MOSES G. HUBBARD, of Norristown, Montgomery county, and State of Pennsylvania, have invented an Improvement in Take-Up and Tension Devices for Grain-Binders, of which the following is a specification.

My invention relates to mechanism attached to grain-binders, and designed to give tension to the binding cord or wire and to regulate the feed of the same; and it consists in mechanism which controls the unwinding of the cord or wire from the holding spool or reel in such a manner as to give greater or less length of cord or wire to bind a relatively greater or smaller bundle, prevent the spinning of the spool, and in every case put the binding cord or wire under the same tension and compress the bundle to the same degree independent of an auxiliary compressor. This mechanism is more fully set forth in the following specification, shown in the accompanying drawings, and referred to in the appended claims.

The object of my invention is to be able to do away with the auxiliary compressor and make the tension device governing the tension and length of the cord or wire to bind the bundle perform the same function in a simpler manner, and to prevent the spinning of the spool after taking off sufficient cord or wire to bind the bundle, without the excessive and continuous tension and rapid wearing of the parts incident to analogous devices.

In the drawings, Figure 1 is a perspective view of the tension device embodying my invention. Fig. 2 is a side elevation of same, showing spool in checked position. Fig. 3 is a similar view, showing spool in position for rotating. Fig. 4 is a section of the same on the line of the axis of the reel or spool.

A is a part of the frame of any grain-binder. It supports and carries, rigidly attached to it by bolts $b\ b$, the bearing-plate B. The plate B is provided with a hole, through which the journal K of the crank-arm P is passed. Through the end of the crank-arm P the bolt or crank-pin C is passed. A loosely-fitting sleeve, D, carries upon the end next to plate B a notched wheel, E, which is secured firmly to said sleeve D. Upon the reel side of the notched wheel E is a conical flange, $e$.

Upon the sleeve D the reel or spool F is passed. The diameter of the hole in the reel is a little greater than the exterior diameter of the sleeve D.

The nut G, carrying upon it a flange, $g$, conical in shape and similar to the flange $e$, is screwed upon the sleeve D, which is provided with threads. The nut G is screwed up until the reel F is held firmly between and by the conical flanges $e$ and $g$, and then said reel becomes, as it were, part of the sleeve D and notched wheel E. The pin $c$ is then put through a hole in the end of the bolt or crank-pin C, to prevent the sleeve and reel from coming off their support. The object of securing the reel to the sleeve and notched wheel and holding it suspended between the wheel and nut is to allow its easy removal, when desired, and yet get a firm hold of the whole spool, in order to arrest its momentum or stop its spinning, without loss of time, by bringing it in contact with the elastic checking device, and it is most important that this checking device should have considerable elasticity to prevent the rapid wear consequent upon sudden concussions. I find this to be of vital importance. One of the best methods of constructing this elastic checking device is in the form of a spring, as shown at S, and which may be bolted or otherwise strongly attached to the plate B.

Attached to the crank-arm P is the extension-arm H, the outer end of which is provided with a guide-hole, J, through which the wire passes; or a small loose ring may be used.

Secured to the frame A at $m$ is a spring, M, which presses down against the spool or crank-arm P to restore it to its normal position, and which, by its resistance, acts as a regulator to the tension when a light spool of cord or wire is used instead of a full one. Through this spring M is a thumb-screw, N, passing into the frame A and pressing against the spring. By screwing up the thumb-screw I can increase the power of the spring, and consequently the degree of tension under which the cord or wire is put, and compress the bundle to a greater or less extent, as desired.

It is not necessary to make the spool separate from the notched wheel, as retarding-notches may be made in the edge of the spool-rim for this purpose, yet I prefer the form of construction above described.

Having described the general construction, I will now proceed to illustrate its mode of operation.

The reel or spool being full of wire or cord X, the end of the said cord or wire is brought from the top of the reel or spool, in order to cause it to revolve in the right direction and tend to screw up the nut G, to keep itself tightly held between the two conical flanges $e$ and $g$, and after passing through the guide-hole J it is connected to the holder of the knotter or twister, or is connected directly to the head of the binder-arm, as the case may be; but all of such mechanism is so located with reference to the guide-hole J in the arm H that should the cord be pulled with a force greater than that exerted by the weight of the spool, (and the additional pressure of the spring when used,) said arm will raise the notch $h$ up from the elastic checking device S, and permit the spool to rotate and the cord to unwind. Supposing that the first bundle to be bound is small, the binder-arm passes the cord around it, but in so doing compresses said bundle by the cord until the force of compression is greater than the tension, then the arm H is pulled up by the cord X, thereby raising the tooth $h$ out of contact with the checking device S, which allows the reel or spool F to revolve freely, giving a small amount or length of cord, whereupon the tension device comes into play again, and the reel F is held from further rotation. If enough cord has not already been had to form the bundle, the strain upon the cord will become greater than the power of the tension device, and the spool will be freed again for one or more notches, as the case may be, until just sufficient cord has been given to bind the bundle and compress it to the proper degree. Now, supposing that the next bundle were twice as large as the first, the tension mechanism would operate in precisely the same manner, only in this case it would require more cord to bind the larger bundle to the same degree of compression. By this it is evident that the tension mechanism is automatic in its action, allowing the spool to revolve freely or preventing its rotation altogether; that every bundle, large or small, is bound with the same degree of compression, and that the amount or length of cord or wire to bind the bundle is wholly governed by the size of said bundle, and any further rotary or spinning motion caused by the momentum of the spool is instantly checked by the elastic checking device S.

Having now described my invention, what I claim as new, and desire to secure by Letters Patent, is—

1. In a grain-binder, the combination of a tension device consisting of a movable spool operated by gravity, with an elastic but positive checking device applied to the spool, in which there is no contact between the spool and checking device during the unwinding of the band, said devices operating to regulate both the tension and supply of the cord or wire constituting said band, and prevent spinning of the spool from its momentum.

2. In a tension device for grain-binders, the combination of the spool F, notched wheel E, crank-arm P, and positive but elastic checking device S, so arranged that the spool or notched wheel E may be brought in contact with the checking device by gravitation.

3. In a tension device for grain-binders, the combination of the spool F, notched wheel E, provided with a conical flange, $e$, nut G, provided with a conical flange, $g$, sleeve D, pin C, and crank-arm P.

4. In a tension device for grain-binders, the spool F, in combination with notched wheel E, crank-arm P, elastic checking device S, adjustment-spring M, and thumb-screw N.

5. In a tension device for grain-binders, a positive yet yielding checking device, in combination with a spool movable to and from said device, as for the purpose specified.

In testimony of which invention I have hereunto set my hand this 10th day of November, A. D. 1880.

MOSES G. HUBBARD.

Witnesses:
R. M. HUNTER,
R. A. DAVIS.